(12) United States Patent
Steinbach et al.

(10) Patent No.: US 7,942,444 B2
(45) Date of Patent: May 17, 2011

(54) AIRBAG MODULE

(75) Inventors: Mark Andrew Steinbach, Clawson, MI (US); Richard Andrew Wiik, Fort Gratiot, MI (US)

(73) Assignee: TK Holdings Inc., Auburn Hills, MI (US)

( * ) Notice: Subject to any disclaimer, the term of this patent is extended or adjusted under 35 U.S.C. 154(b) by 208 days.

(21) Appl. No.: 12/222,124

(22) Filed: Aug. 1, 2008

(65) Prior Publication Data
US 2010/0025971 A1 Feb. 4, 2010

(51) Int. Cl.
*B60R 21/16* (2006.01)
(52) U.S. Cl. .................... 280/743.2; 280/730.2
(58) Field of Classification Search ............... 280/743.2, 280/730.2, 729
See application file for complete search history.

(56) References Cited

U.S. PATENT DOCUMENTS

| | | | |
|---|---|---|---|
| 5,730,464 A | 3/1998 | Hill | |
| 6,010,149 A * | 1/2000 | Riedel et al. | 280/730.2 |
| 6,394,487 B1 * | 5/2002 | Heudorfer et al. | 280/729 |
| 6,588,796 B2 * | 7/2003 | Webber et al. | 280/737 |
| 6,896,325 B2 * | 5/2005 | Takedomi et al. | 297/216.1 |
| 7,455,314 B2 * | 11/2008 | Ryan et al. | 280/729 |
| 2001/0042974 A1 * | 11/2001 | Sasaki et al. | 280/728.2 |
| 2003/0230883 A1 | 12/2003 | Heym | |
| 2004/0169356 A1 * | 9/2004 | Linder et al. | 280/730.2 |
| 2004/0232666 A1 * | 11/2004 | Sato et al. | 280/730.2 |
| 2005/0206138 A1 | 9/2005 | Breuninger et al. | |
| 2006/0125213 A1 * | 6/2006 | Kruse | 280/730.2 |
| 2006/0175814 A1 * | 8/2006 | Jang et al. | 280/730.2 |
| 2007/0040364 A1 * | 2/2007 | Linder et al. | 280/730.2 |
| 2009/0184500 A1 * | 7/2009 | Feller et al. | 280/730.2 |

* cited by examiner

*Primary Examiner* — Faye M. Fleming
*Assistant Examiner* — Drew Brown
(74) *Attorney, Agent, or Firm* — Foley & Lardner LLP

(57) ABSTRACT

The disclosed airbag device for a vehicle may comprise an airbag and at least one connection member. The airbag may have first and second side surfaces, wherein the first side surface has upper and lower ends. The at least one connection member may connect the lower end of the first side surface to an intermediate position on the first side surface located between the upper and lower ends of the first side surface.

20 Claims, 11 Drawing Sheets

Figure 1:
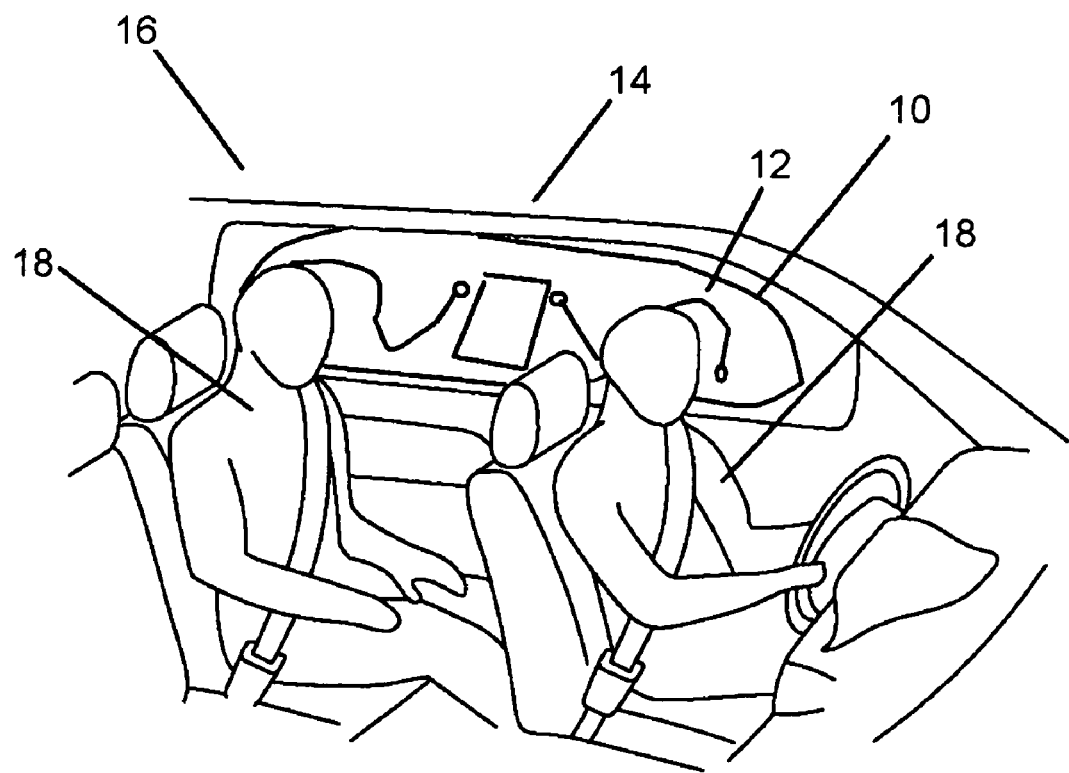

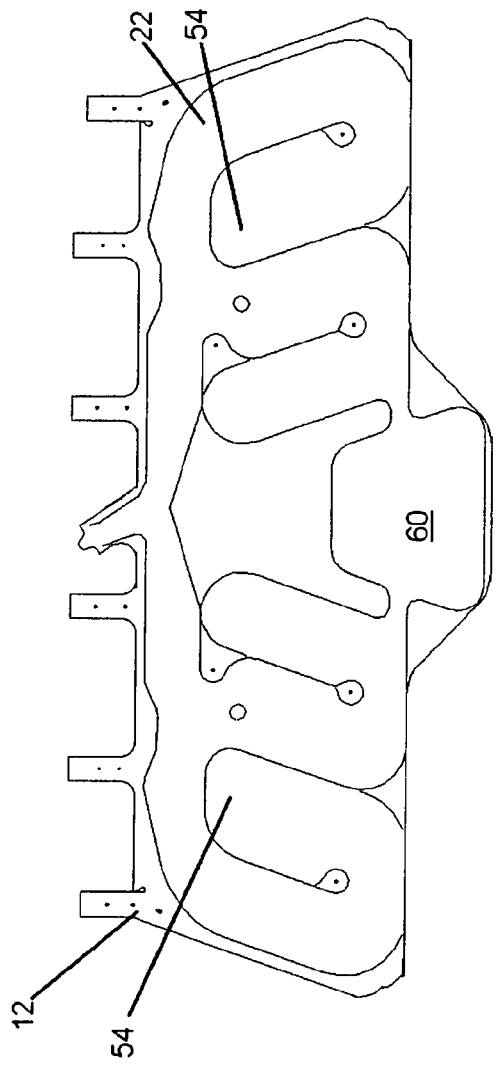
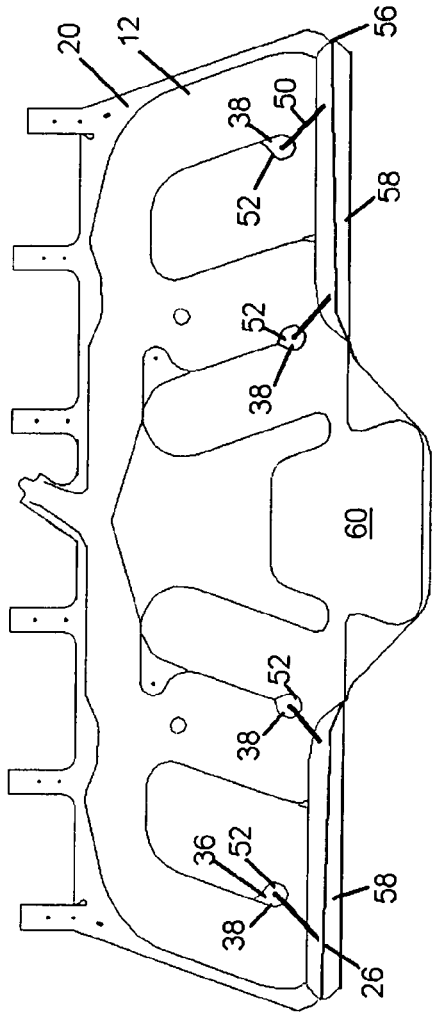
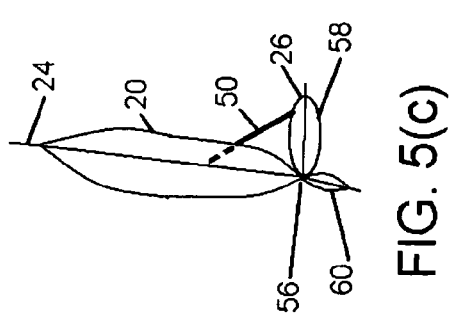

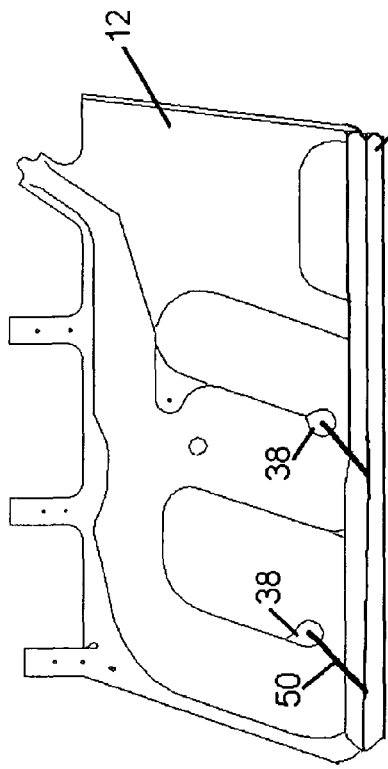
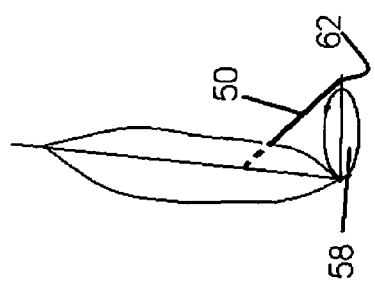
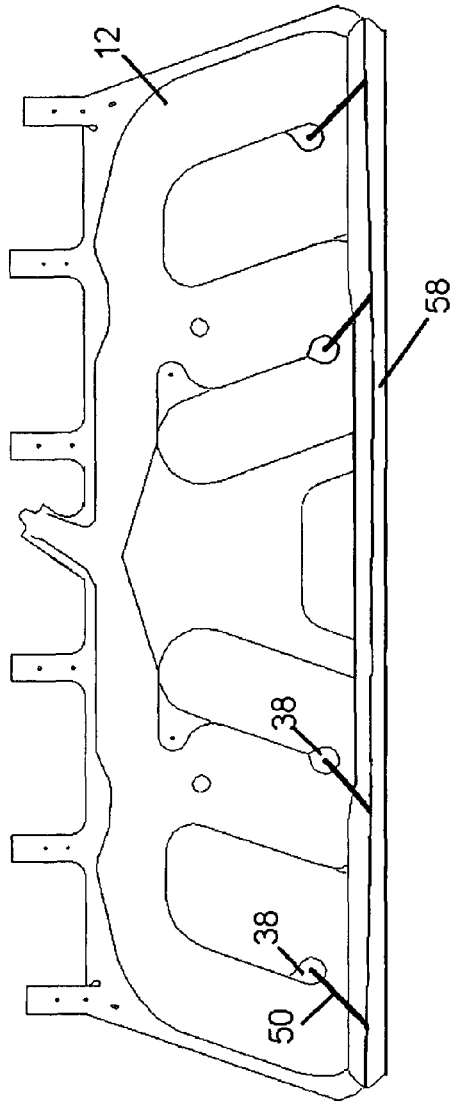
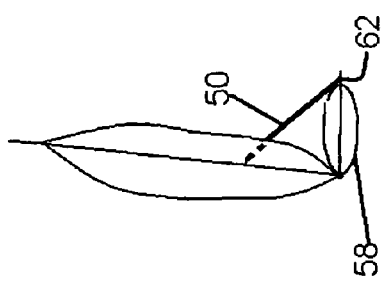
FIG. 8(a)
FIG. 8(b)
FIG. 9(a)
FIG. 9(b)

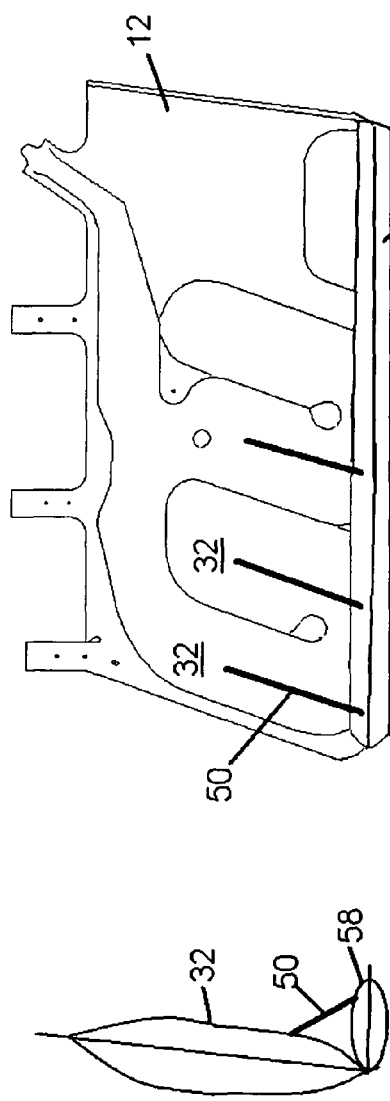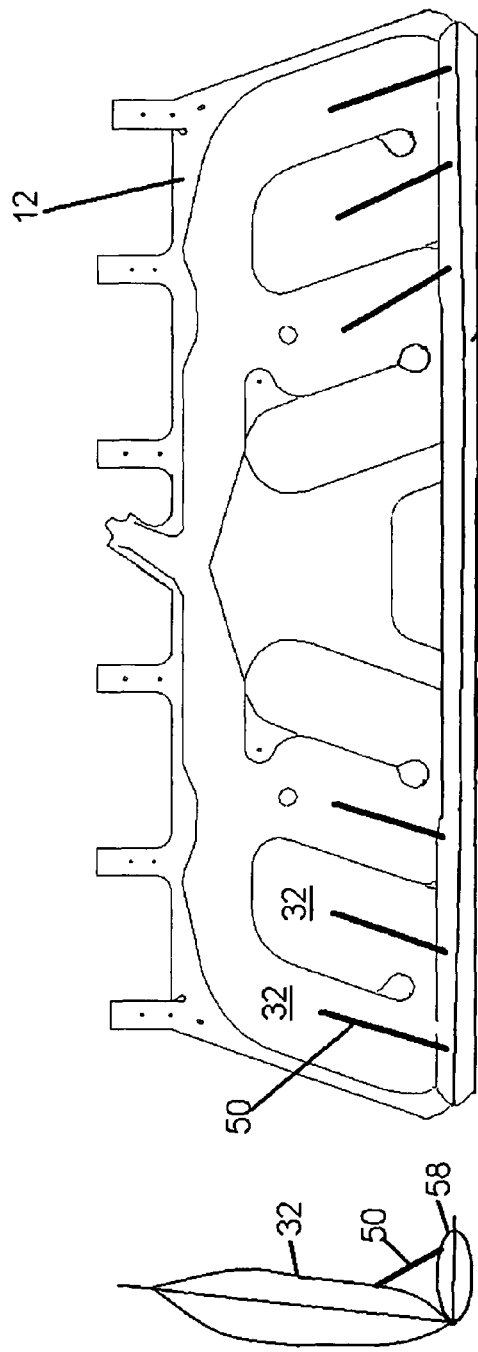

AIRBAG MODULE

BACKGROUND

The present invention relates generally to the field of airbags and occupant protection systems. More specifically, the invention relates to airbags with a connection member, such as a tether, for improved occupant containment performance.

Head Side Airbags (HSABs) have generally been designed based on a vehicle's occupant seating location. Each occupant's head has typically been protected by an inflated cushion chamber. In earlier designs, the cushion typically would not extend below or interact with the vehicle beltline. As new governmental requirements were initiated which required a vehicle's occupants to be protected during a rollover event, the size of the airbags grew taller to reach the vehicle beltline, or below.

To aid in occupant containment during rollover events, HSAB designs may accommodate a larger coverage area, which is defined by the window openings as well as by occupant seating positions. These larger coverage areas result in larger cushion sizes and volumes, increased inflator outputs and longer inflation time requirements. In the case of a large SUV or minivan, with the highest propensity to undergo a rollover event, these new systems could incorporate a very large cushion and require a very large inflator.

SUMMARY

According to one embodiment of the present invention, an airbag device for a vehicle, may comprise an airbag and at least one connection member. The airbag may have first and second side surfaces, wherein the first side surface has upper and lower ends. The at least one connection member may connect the lower end of the first side surface to an intermediate position on the first side surface located between the upper and lower ends of the first side surface.

According to another embodiment of the present invention, an occupant protection system may comprise a head-side airbag and a seat-mounted side airbag. The seat-mounted side airbag may be configured to occupy a coverage area early in a crash event and the head-side airbag may be configured to occupy the same coverage area at a later time during the crash event.

It is to be understood that both the foregoing general description and the following detailed descriptions are exemplary and explanatory only, and are not restrictive of the invention as claimed.

BRIEF DESCRIPTION OF THE DRAWINGS

These and other features, aspects and advantages of the present invention will become apparent from the following description, appended claims, and the accompanying exemplary embodiments shown in the drawings, which are briefly described below.

FIG. 1 is a general perspective view of an airbag device according to an embodiment of the present invention.

FIGS. 2(*a*) and 2(*b*) are front and side views, respectively, of an airbag according to an embodiment of the present invention before the connection member is added.

FIGS. 3(*a*) and 3(*b*) are front and side views, respectively, of an airbag according to another embodiment of the present invention before the connection member is added.

FIGS. 4(*a*), 4(*b*), and 4(*c*) are front, back, and side views, respectively, of the airbag of FIGS. 2(*a*) and 2(*b*) in the deployed state and with connection members attached.

FIGS. 5(*a*), 5(*b*), and 5(*c*) are front, back, and side views, respectively, of the airbag of FIGS. 3(*a*) and 3(*b*) in the deployed state and with connection members attached.

FIGS. 6(*a*) and 6(*b*) are back and side views, respectively, of an airbag according to another embodiment of the present invention.

FIGS. 7(*a*) and 7(*b*) are back and side views, respectively, of an airbag according to another embodiment of the present invention.

FIGS. 8(*a*) and 8(*b*) are back and side views, respectively, of an airbag according to another embodiment of the present invention.

FIGS. 9(*a*) and 9(*b*) are back and side views, respectively, of an airbag according to another embodiment of the present invention.

FIGS. 10(*a*) and 10(*b*) are back and side views, respectively, of an airbag according to another embodiment of the present invention.

FIGS. 11(*a*) and 11(*b*) are back and side views, respectively, of an airbag according to another embodiment of the present invention.

FIG. 12 is a schematic diagram of an occupant protection system according to an embodiment of the present invention.

FIGS. 13(*a*), 13(*b*), and 13(*c*) are front, back, and side views, respectively, of the airbags of an occupant protection system according to an embodiment of the present invention.

DETAILED DESCRIPTION

Embodiments of the present invention have been designed in order to keep the airbag volume to a manageable size, as well as the size of an inflator to be used to inflate the airbag. According to one embodiment of the present invention, a tethered chamber interacts with the vehicle trim or acts as a stiffening member to the inflated airbag chambers. According to another embodiment of the present invention, a late-filling cushion chamber at select locations is used to reduce interaction with seat-mounted side airbags.

Description of various embodiments of the present invention will be described in reference to the figures. FIG. 1 is a perspective view of an airbag device 10 according to an embodiment of the present invention. The airbag device 10 may include an airbag 12 and at least one connection member. The airbag 12 may be a head-side airbag configured to be positioned in a roof 14 of a vehicle 16 so that the airbag deploys downwardly toward the vehicle occupants 18.

FIGS. 2(*a*) and 2(*b*) are front and side views of an airbag 12 according to an embodiment of the present invention before the connection member is added. The airbag 12 of FIG. 2(*a*) has a length such that it acts as a head-side airbag for a single occupant. FIGS. 3(*a*) and 3(*b*) are front and side views of an airbag 12 according to another embodiment of the present invention before the connection member is added. The airbag 12 of FIG. 3(*a*) has a length such that it acts as a curtain airbag which traverses the entire length of the vehicle. The airbags 12 of FIGS. 2(*a*) and 3(*a*) may include a head receiving portion 54 configured to receive an occupant's head during a collision or crash event.

The airbags 12 of FIGS. 2(*a*), 2(*b*), 3(*a*), and 3(*b*) each have a first side surface 20 and a second side surfaces 22. The first side surface 20 has an upper end 24 and a lower end 26, and face towards the vehicle body upon deployment. The second side surface 22 is positioned adjacent the vehicle occupant upon deployment. The airbag 12 may be formed of a first panel 28 and a second panel 30 connected to form one or more inflatable chambers 32 formed therebetween. The first and second panels may be two separate panels that are attached to each other or may be two halves of a single piece of material that is folded over and then attached together. The panels 28 and 30 are attached to each other by any known means in the art, such as by sewing, stitching, adhesives, or the like.

A plurality of inflatable chambers 32 may be formed, which may be divided by seams 34. The seams 34 are lines of stitching, adhesives, or the like which attach the first and second panels together and seal the inflatable chambers 32. There are non-inflatable portions 36 which are interspersed between the chambers 32. The non-inflatable portions 36 may be points of attachment 38 between the first and second panels 28 and 30 or may be areas 40 sealed off by the chambers 32 using seams 34.

The airbag 12 may be positioned in the roof 14 of the vehicle 16 using tabs 42 which are connected to corresponding brackets (not shown) located in a storage space in the roof of the vehicle. The tabs 42 may include, for example, apertures 44 through which fasteners (such as screws or the like) are fed through and fixed to the vehicle body. The airbag also has an entry channel 46 configured to receive an inflator so that gas may be introduced into the airbag 12 upon deployment.

Figure 2B:
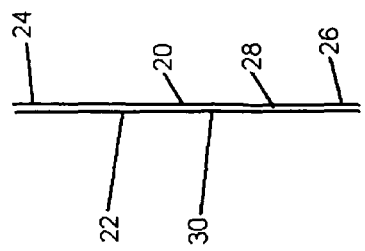
Figure 2A:
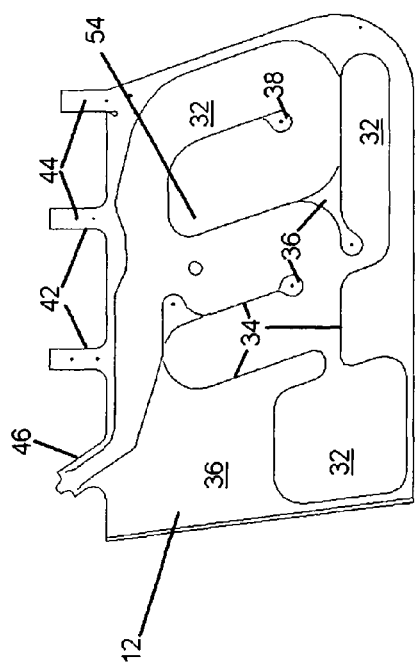
Figure 3B:
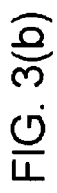
Figure 3A:
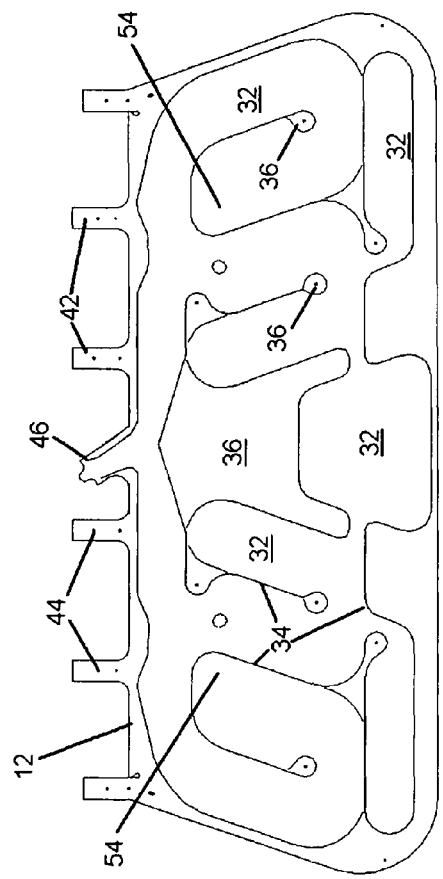
Figure 4A:
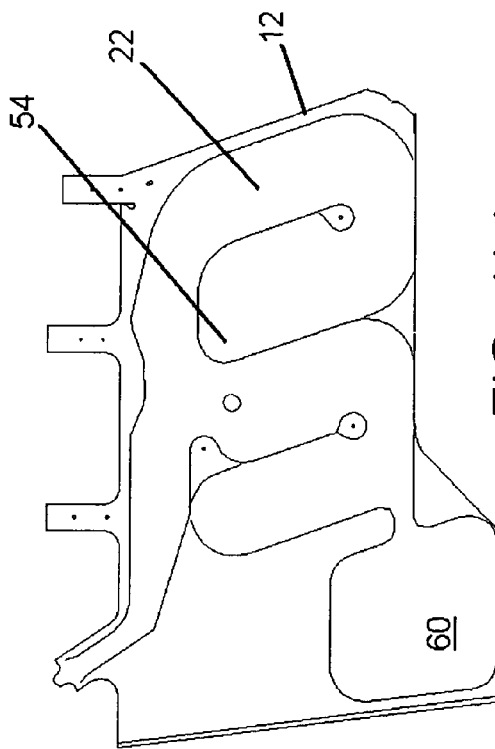
Figure 4B:
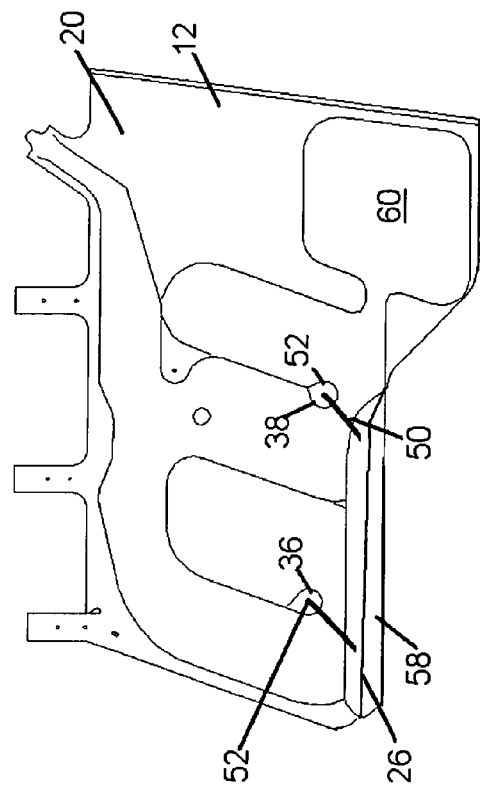
Figure 4C:
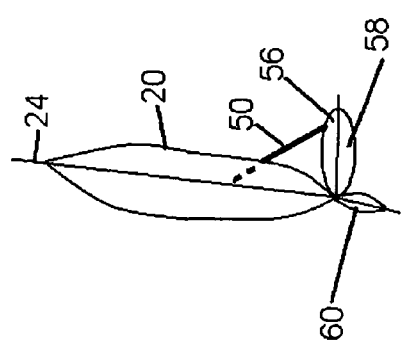

The airbag device 10 also may comprise at least one connection member 50 connecting the lower end 26 of the first side surface 20 to an intermediate position 52 on the first side surface 20 located between the upper and lower ends 24 and 26 of the first side surface 20. FIGS. 4(a), 4(b), and 4(c) are front, back, and side views, respectively, of the airbag of FIGS. 2(a) and 2(b) in the deployed state and with the at least one connection member attached. FIGS. 5(a), 5(b), and 5(c) are front, back, and side views, respectively, of the airbag of FIGS. 3(a) and 3(b) in the deployed state and with the at least one connection member attached.

The at least one connection member 50 may comprise any suitable tether, such as, for example, a strap, a cable, a cord, or the like. Also, the at least one connection member 50 may be only one or a plurality of connection members, such as two, three, four or more. The ends of the connection members 50 connected to the intermediate position 52 and the lower end 26 may be attached by any known mechanism in the art, such as stitching, sewing, adhesives, or the like. The intermediate position in which an end of the connection member 50 is attached may be at any suitable location, such as at approximately the center of the airbag or lower than the center in a vertical direction. The intermediate position may be within the bottom half, within the bottom third, and/or above the bottom quarter of the airbag in the vertical direction. As seen in FIGS. 4(a) through 4(c) and 5(a) through 5(c), the intermediate position 52 on the first side surface 20 is located on a non-inflatable portion 36, such as the attachments points 38 of the first and second panels (e.g., circular seams), while the attachment point on the lower end 26 is located on an inflatable chamber 32. The lower end of the airbag at which the connection member is attached may be within the bottom quarter of the airbag in the vertical direction, within the bottom eighth of the airbag in the vertical direction, and/or in the vicinity of or adjacent to the bottom edge of the airbag. By the same token, the upper end of the airbag may be within the upper quarter of the airbag in the vertical direction, within the upper eighth of the airbag in the vertical direction, and/or in the vicinity of or adjacent to the top edge of the airbag.

Furthermore, the connection member 50 may be so attached such that, when the airbag 12 is deployed, the airbag forms a generally "L" shape or a convex profile when viewed from the side, as seen in FIGS. 4(c) and 5(c). The lower portion 56 of the airbag 12 may include tethered chambers 58 that protrude rearward of the airbag so as to abut the vehicle body upon deployment and non-tethered chambers 60, which do not protrude rearward of the airbag upon deployment.

Occupant containment performance is improved with the tethered configuration by allowing the loading of the airbag 12 earlier in the impact event, thus providing energy absorption sooner than in a standard cushion design. For instance, the tethering of the adjoining airbag chambers 32 creates a convex or L-shaped profile, closer to the occupant 18. In other words, the interaction of the tethered chambers 58 with the vehicle interior structure creates a physical stand-off that allows for pre-loading of the vehicle occupant 18, which helps to absorb the energy of the impact earlier in the event. Thus, the tethered design ultimately reduces the excursion distance of the occupant 18 from the vehicle 16 due to improved energy management.

Also, the connection member 50, such as a tether, added between two or more adjoining airbag chambers 32 increases the stiffness of the overall airbag structure in a vertical plane, thereby increasing its ability to resist buckling (bending) during the loading by the occupant 18 from the inside of the vehicle 16.

Furthermore, based on the geometric advantage produced by the tethered chambers 58, the resultant airbag volume is reduced from a standard "high loft" or thick chamber airbag that would be used to afford the same stand-off distance from the vehicle interior structure. The volume reduction is beneficial because the higher loft or thick chamber airbag occupies a larger inflated volume, which would require a larger inflator size than that for the airbag with tethered chambers 58.

Figure 6A:
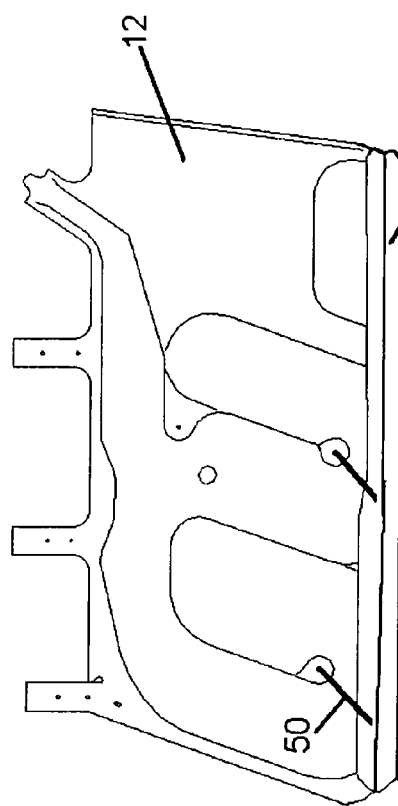
Figure 6B:
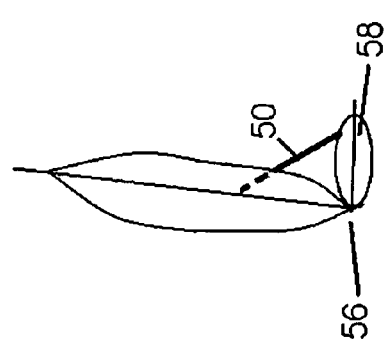
Figure 7A:
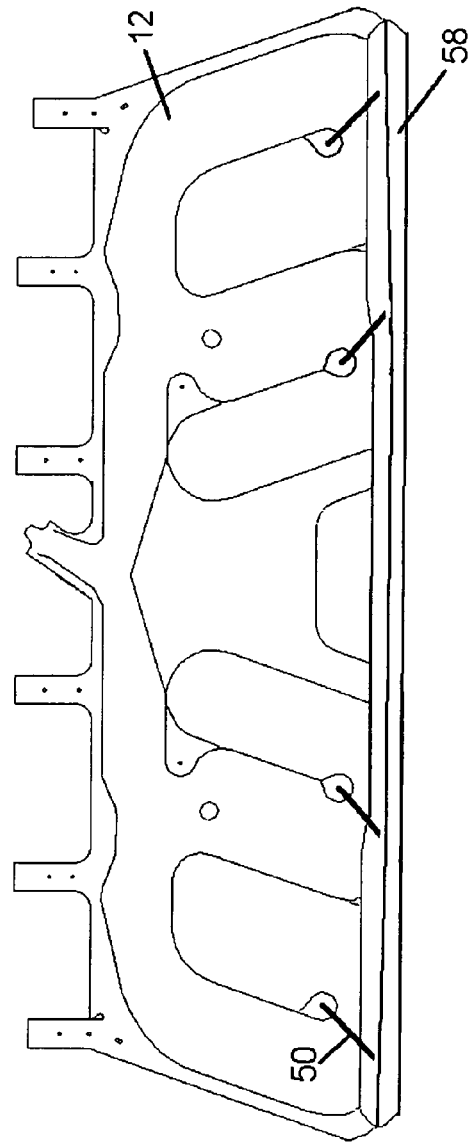
Figure 7B:
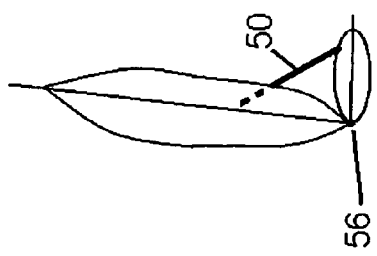

Other configurations of the airbag are also contemplated. For example, FIGS. 6(a) and 6(b) are back and side views, respectively, of an airbag similar to the one shown in FIGS. 4(a) through 4(c) in the deployed state but without any non-tethered chambers located in the lower portion 56 of the airbag 12. FIGS. 7(a) and 7(b) are back and side views, respectively, of an airbag similar to the one shown in FIGS. 5(a) through 5(c) in the deployed state but without any non-tethered chambers located in the lower portion 56 of the airbag 12. As shown in FIGS. 6(a) and 7(a), there is one tethered chamber 58 along substantially the entirely longitudinal length of the airbag 12.

FIGS. 8(a) and 8(b) are back and side views, respectively, of an airbag similar to the one shown in FIGS. 4(a) through 4(c) in the deployed state but the connection members 50 are connected to non-inflatable portions at both ends. FIGS. 9(a) and 9(b) are back and side views, respectively, of an airbag similar to the one shown in FIGS. 5(a) through 5(c) in the deployed state but the connection members 50 are connected to non-inflatable portions at both ends. As shown in FIGS. 8(b) and 9(b), each connection member 50 is connected to an attachment point 38 connecting the first and second panels of the airbag together at one end and to non-inflatable portion 62 at the periphery of the airbag between the tethered chambers 58 and the edge of the airbag 12. As shown in FIGS. 8(a) and 9(a), there is one tethered chamber 58 along substantially the entirely longitudinal length of the airbag 12.

FIGS. 10(a) and 10(b) are back and side views, respectively, of an airbag similar to the one shown in FIGS. 4(a) through 4(c) in the deployed state but the connection members 50 are connected to inflatable portions at both ends. FIGS. 11(a) and 11(b) are back and side views, respectively, of an airbag similar to the one shown in FIGS. 5(a) through 5(c) in the deployed state but the connection members 50 are connected to inflatable portions at both ends. As shown in FIGS. 10(b) and 11(b), each connection member 50 is connected to an inflatable chamber 32 at one end and to a tethered chamber 58 at the other. Also, the point of attachment of the connection member to the inflatable chamber 32, i.e., the intermediate position, is located approximately center of the head-side airbag in the vertical direction but can be located at a point lower than the center. Furthermore, as shown in FIGS. 10(a) and 11(a), there is one tethered chamber 58 along substantially the entirely longitudinal length of the airbag 12.

Figure 12:
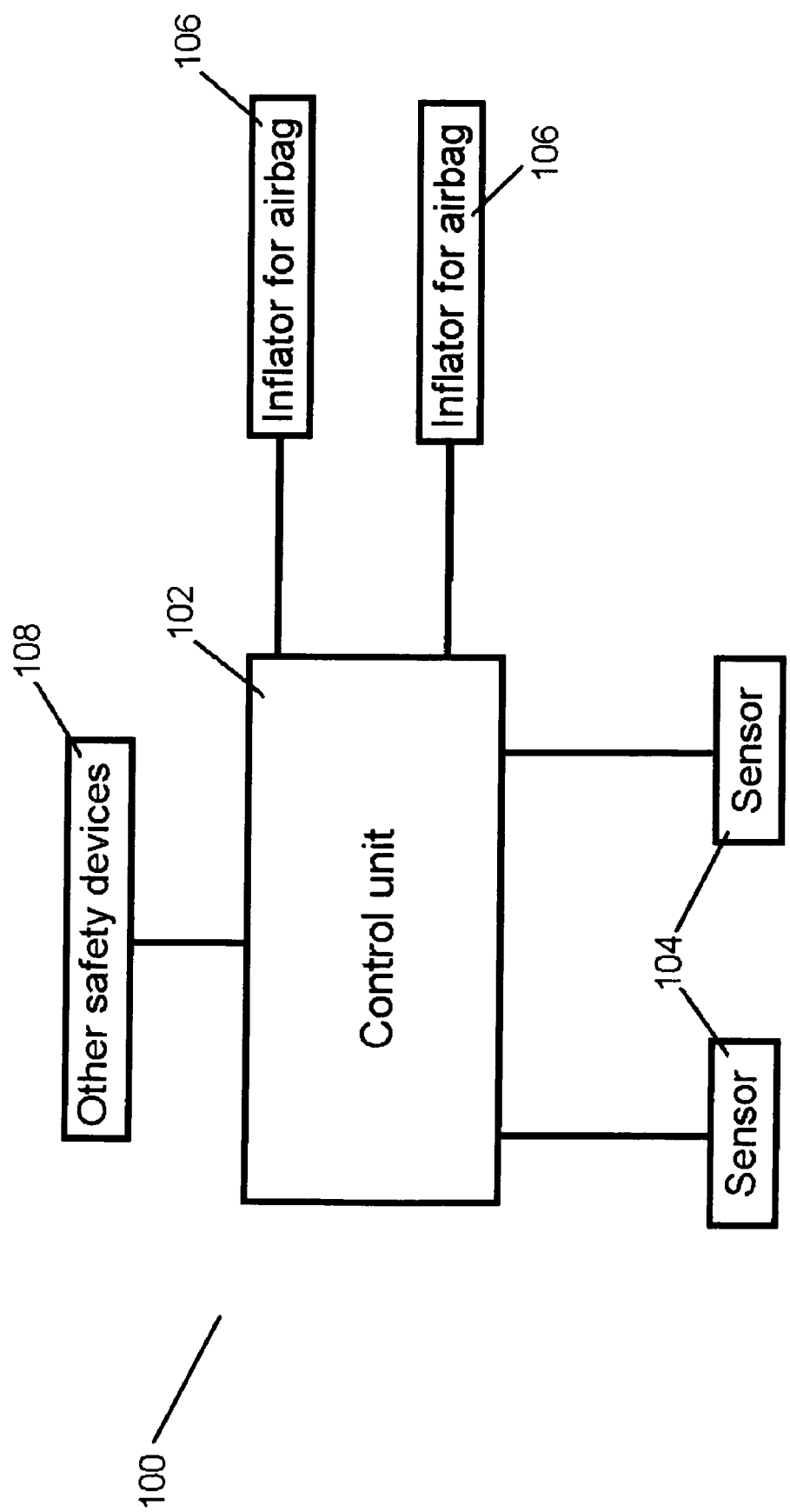

The airbag 12 according to any embodiment of the present invention, including those shown in FIGS. 2(a) through 11(b), may be used in conjunction with an occupant protection system 100 which is schematically shown in FIG. 12. The occupant protection system 100 may include a control unit 102, one or more sensors 104 used to detect impacts which are known in the art, one or more airbags with inflators 106, and/or other safety devices 108.

The control unit 102 may be located in any suitable location within the vehicle and includes the necessary hardware and/or software to receive signals from the one or more sensors 104, determine whether a crash event is occurring and/or which parts of the vehicle are affected by the crash event, and send a deployment signal to one or more airbag devices if the crash parameters deem a deployment in one or more airbag devices 22 is necessary to protect one or more occupants. The control unit 102 may also operate one or more other safety devices 108, if necessary or desired. For example, in addition to the vehicles airbags, the control unit 102 may initiate one or more of the following: seat belt retractors, audio or visual alarms, the vehicle's braking system, or the like.

The one or more airbags whose inflators 106 are initiated by the control unit 102 may include, for example, any of the airbags shown in FIGS. 2(a) through 11(b), a seat-mounted side airbag, and/or a front-side airbag. The airbags may include those that are used to protect two or more vehicle occupants or those that are used to protect a single occupant.

Figure 13A:
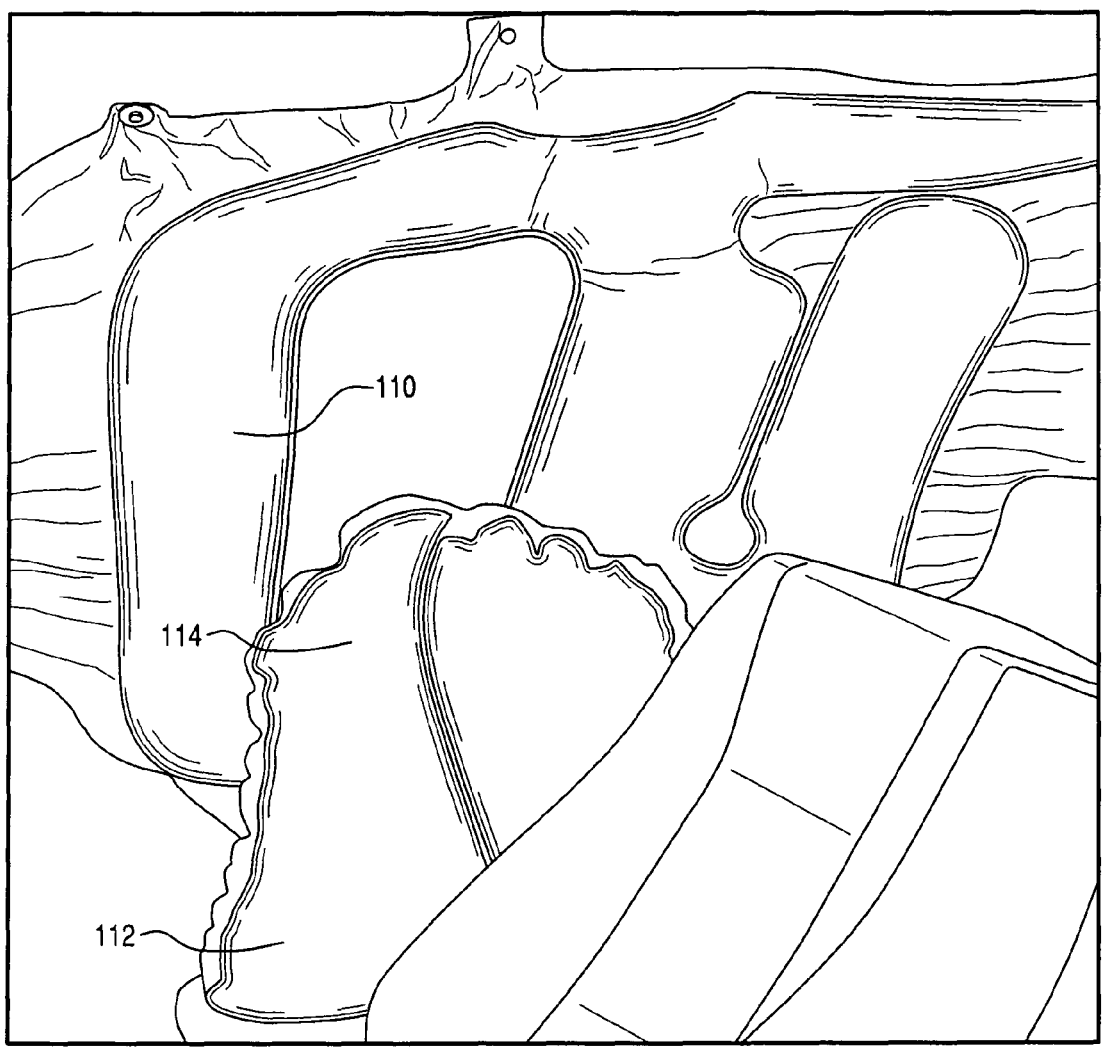
Figure 13B:
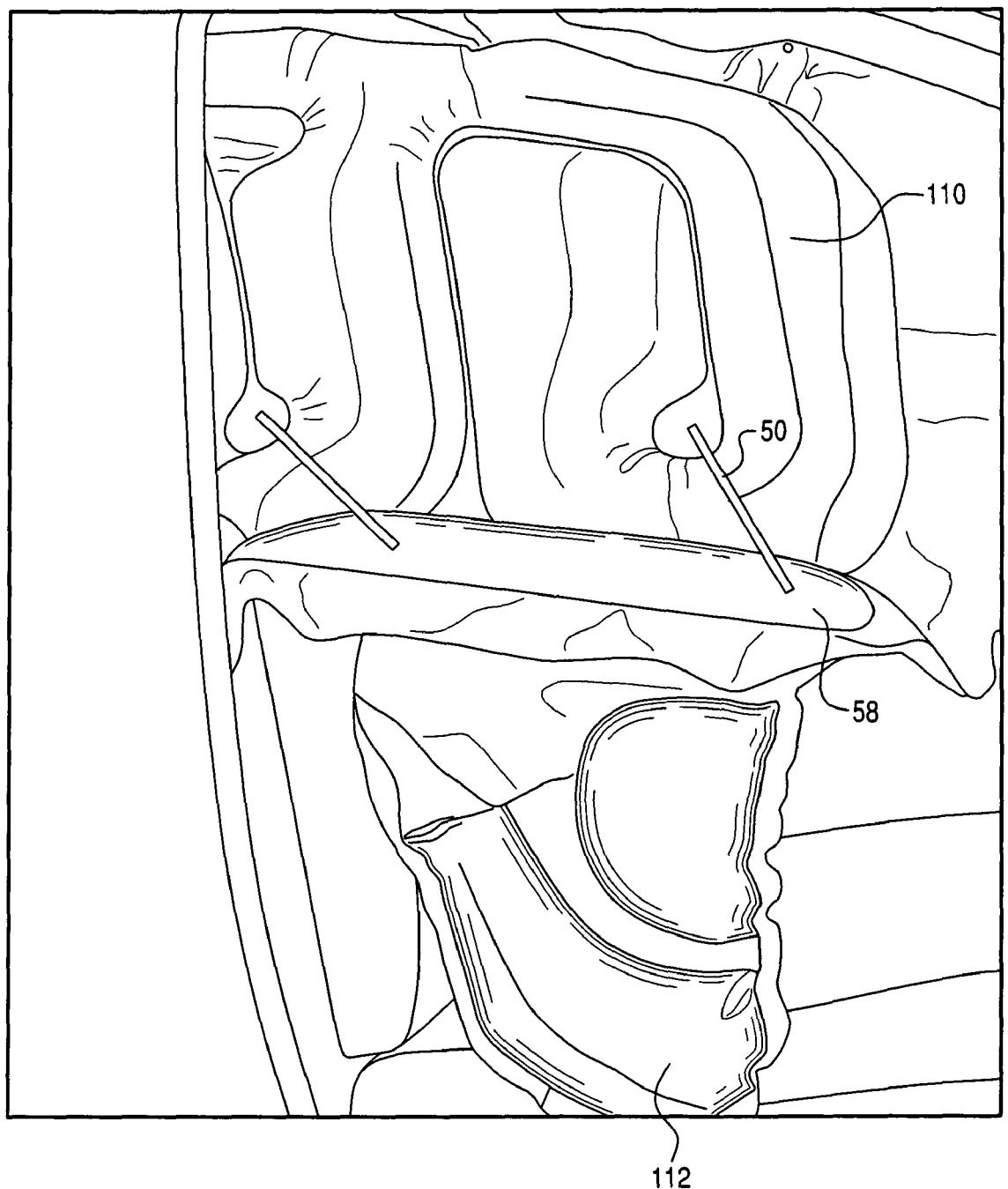
Figure 13C:
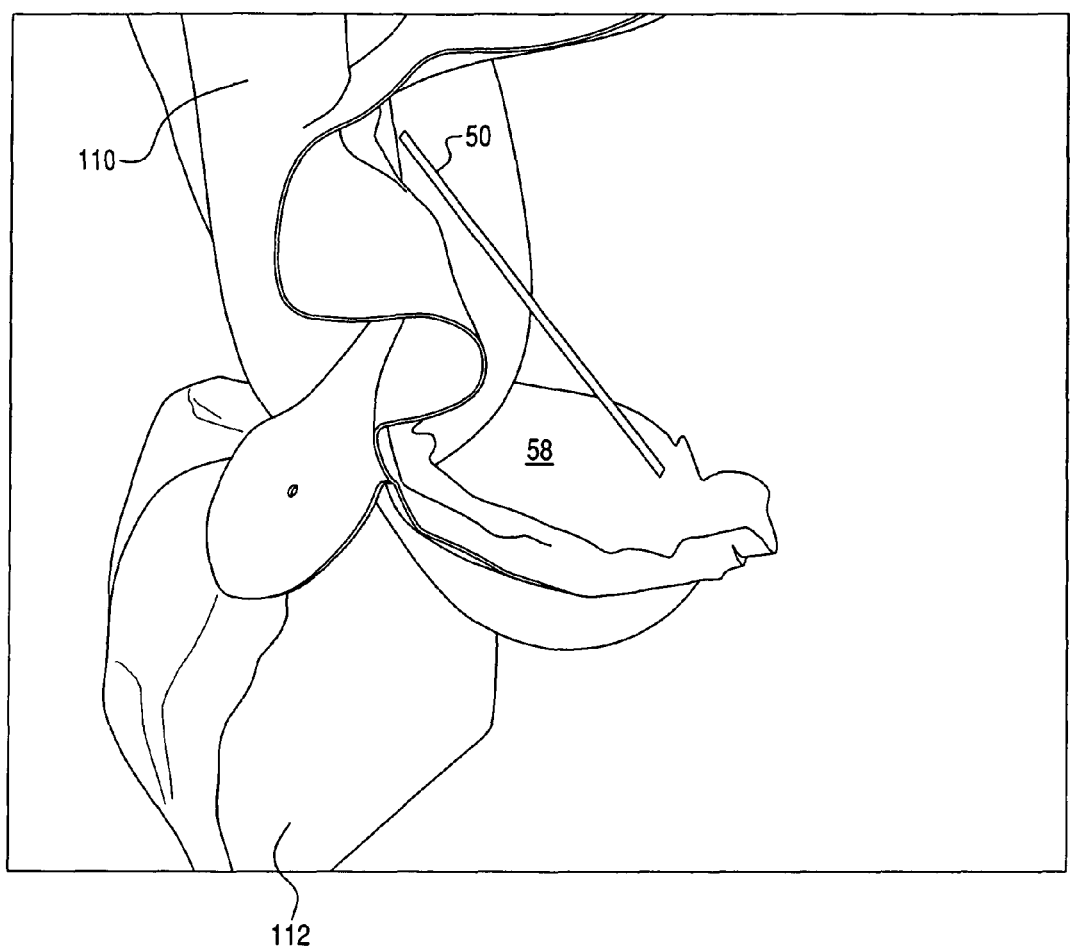

FIGS. 12 and 13(a) through 13(c) show one embodiment of the present invention in which the occupant protection system 102 may comprise a head-side airbag 110 and a seat-mounted side airbag 112. FIGS. 13(a) through 13(c) are front, back, and side views, respectively, of the airbags of an occupant protection system 102. The head-side airbag 110 may be any of the airbags shown in FIGS. 2(a) through 11(b), which are stored in a storage space behind a roof liner in the roof of the vehicle. The tethered chambers 58 of the head-side airbag 110 may be late-filling, which means that the tethered chambers 58 of the head-side airbag 110 are inflated at a time later than the time that the seat-mounted side airbag 112 is inflated. With the late-filling tethered chambers 58, the interaction with the seat-mounted side airbag 112 can be reduced allowing the seat-mounted side airbags 112 to occupy its coverage area early in the impact event because the head-side airbag 110 is filled later. Later on, the same coverage space 114 may be occupied by the head-side airbag 110 when the seat-mounted side airbag 112 is deflated due to vent holes on the outer surface of the airbag 112 and/or occupant impact. Upon deployment by activation of the inflator 106 by the control unit 102, the head-side airbag 110 emerges from the roof liner through a tear seam or the like and deploys downwardly toward the vehicle occupant.

The seat-mounted side airbag 112 is an airbag stored in a storage space inside an occupant seat. Upon deployment by activation of the inflator 106 by the control unit 102, the seat-mounted side airbag 112 emerges from the seat through a tear seam or the like and deploys upwardly toward the vehicle occupant.

The inflation of the airbags 110 and 112 may be timed by the control unit 102 so that the seat-mounted side airbag 112 occupies a coverage area 114 early in the crash event and the head-side airbag 110 occupies the same coverage area 114 at a later time during the crash event when the seat-mounted side airbag 112 has been deflated due to vent holes on the outer surface of the airbag 112 and/or occupant impact. Accordingly, the control unit 102 controls the inflator 106 of the seat-mounted side airbag 112 and the inflator 106 of the head-side airbag 110. The coverage area 114 may be an area upon which the torso of the vehicle occupant may impact the vehicle body. Thus, the seat-mounted side airbag 112 is configured to protect the torso of the vehicle occupant early during the crash event and the head-side airbag 110 is configured to protect the head and torso of the vehicle occupant at the later time during the crash event.

As described herein, when the tethering concept is used in conjunction with a late-filling airbag chamber, the controlled inflation of the head-side airbag relative to the seat-mounted side airbag is possible. Such a configuration allows the two airbags to occupy the same protection zone, but at different times during the crash event, thereby allowing each airbag to meet its specific protection criteria when required. In other words, the seat-mounted side airbag will protect the vehicle occupant in the first torso impact event while the later-filled head-side airbag will provide the protection for the head impact and body excursion at a later time during the crash event. Also, the performance advantages (stiffness and stand-off) provided by the tethered chamber(s) in the shared coverage area are made possible by using the connection members.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. An airbag device configured to deploy along an interior side of a passenger compartment of a vehicle, comprising:
    an inflatable airbag including a plurality of inflatable chambers;
    wherein each of the chambers are formed by seams joining adjacent sides of the airbag;
    wherein one of the inflatable chambers is tethered to another portion of the airbag by a connection member;
    wherein the airbag is configured so that when the airbag inflates the airbag bends along a seam of the tethered chamber and the tethered chamber deploys substantially outboard an adjacent one of the plurality of inflatable chambers;
    wherein the airbag device further comprises a constricted gas passage to the tethered chamber; and
    wherein the gas passage is configured so that the tethered chamber fills after the other ones of the plurality of inflatable chambers.

2. The airbag device of claim 1, wherein the airbag is configured to inflate into a position such that the connection member is located between the airbag and the side of the passenger compartment and contact between the connection member and a vehicle occupant is prevented.

3. The airbag device of claim 1, wherein the another portion of the airbag is located on an opposite side surface of the airbag from a side surface positioned adjacent a vehicle occupant.

4. The airbag device of claim 1, wherein the another portion of the airbag comprises a non-inflatable portion of the airbag.

5. The airbag device of claim 1, wherein the airbag includes a head receiving portion configured to receive a vehicle occupant's head during a collision event.

6. The airbag device of claim 1, wherein the another portion is located approximately center of the airbag or lower than the center in a vertical direction.

7. The airbag device of claim 1, wherein the airbag comprises a first panel and a second panel connected along the seams to form the plurality of inflatable chambers therebetween.

8. The airbag device of claim 1, wherein the connection member comprises a tether.

9. The airbag device of claim 8, wherein the tether is a strap.

10. The airbag device of claim 1, wherein the connection member is one of a plurality of connection members.

11. The airbag device of claim 1, wherein the airbag is a head-side airbag configured to be positioned in a roof of a vehicle so that the airbag deploys downwardly toward a vehicle occupant.

12. The airbag device of claim 1, wherein the tethered chamber is substantially horizontal.

13. An occupant protection system comprising:
a head-side airbag; and
a seat-mounted side airbag,
wherein the head-side airbag includes a plurality of inflatable chambers by seams joining adjacent sides of the airbag;
wherein one of the inflatable chambers is tethered to another portion of the head-side airbag by a connection member; and
wherein the head-side airbag is configured so that when the head-side airbag inflates the head-side airbag bends along a seam of the tethered chamber and the tethered chamber deploys substantially outboard an adjacent one of the plurality of inflatable chambers;
wherein an upper portion of the seat-mounted side airbag is configured to occupy a coverage area and a lower portion of the head-side airbag including the tethered chamber is configured to occupy the same coverage area.

14. The occupant protection system of claim 13, wherein the seat-mounted side airbag is configured to protect a torso of a vehicle occupant early during a crash event and the head-side airbag is configured to protect the head and torso of the vehicle occupant at a later time during the crash event.

15. The occupant protection system of claim 13, wherein the head-side airbag is configured to inflate into a position such that the connection member faces a vehicle body and contact between the connection member and a vehicle occupant is prevented.

16. The occupant protection system of claim 13, wherein the another portion of the head-side airbag is located on a non-inflatable portion of the head-side airbag.

17. The occupant protection system of claim 13, wherein the another portion of the head-side airbag is located approximately center of the head-side airbag or lower than the center in a vertical direction.

18. The occupant protection system of claim 13, wherein the connection member comprises a tether.

19. The occupant protection system of claim 18, wherein the tether is a strap.

20. The occupant protection system of claim 13, wherein the head-side airbag includes a constricted gas passage through which inflation gas enters the tethered chamber and wherein the gas passage is configured so that the tethered chamber fills after inflation of the side airbag.

* * * * *